Nov. 3, 1942.     R. L. TWEEDALE     2,301,097
POWER TRANSMISSION
Filed March 8, 1941

INVENTOR
Ralph L. Tweedale

Patented Nov. 3, 1942

2,301,097

UNITED STATES PATENT OFFICE 2,301,097

POWER TRANSMISSION

Ralph L. Tweedale, Detroit, Mich., assignor to Vickers Incorporated, Detroit, Mich., a corporation of Michigan Application March 8, 1941, Serial No. 382,289

3 Claims. (Cl. 285—1)

This invention relates to power transmissions, particularly to those of the type comprising two or more fluid pressure energy translating devices, one of which may function as a pump and another as a fluid motor.

The invention is more particularly concerned with a sealing ring for use in conduit joints used in such transmissions.

In the patent to Joseph A. Martin, No. 2,204,507, there is disclosed a sealing ring formed of semi-hard neoprene and adapted to be positioned in an annular recess surrounding a conduit at the juncture between two separable members. Rings of this character have been very successful in eliminating the many small drips and seepages previously encountered at conduit joints in hydraulic power transmission systems. Such rings have been found to hold a tight seal without the slightest drip or seepage under conditions where previously used constructions would leak badly. As a result of this, some users of these sealing rings have overworked their capabilities and have attempted to use them under such severe conditions as to materially shorten their useful life. For example, the matter of rigidity and resistance to warpage or other separation of the two main members of the conduit joint requires far less attention with such sealing rings than with prior constructions. They will hold their seal even though the crack between the two joint members should open up as much as fifteen or twenty thousandths of an inch under warping stresses. Some users, however, have attempted to apply the rings in joints where, due to improper design of the parts, the crack will open up to a greater distance and thus permit the material of the sealing ring to begin to flow through the crack when it is opened under high pressure forces.

For some purposes it is occasionally desirable to utilize a sealing ring of softer material than is usually used and which has a tendency to flow outwardly or extrude through the crack, even though the design of the joint parts be very heavy so that the crack does not open up very wide under warping stresses. With softer or more flowable materials of this nature it is therefore desirable to prevent any possibility of such extrusion into the crack.

It is an object of the present invention to provide an improved sealing ring in which the possibility of flow of the neoprene or similar material through the crack is prevented even though the crack be opened to a distance many times that which would permit flow with the ring of the Martin patent.

It is also an object to provide an improved sealing ring in which the neoprene or similar material is economically used and which is independent of the resilience thereof for maintaining sealing contact at all times.

A further object is to provide in connection with a ring of this character a retaining ring of sheet metal which is shaped to maintain the neoprene or similar material in tight contact with the walls of the recess on each member in such a way that neither fluid pressure nor inherent resilience of the neoprene is exclusively relied upon to maintain such contact.

It is also an object of the invention to provide an improved conduit joint wherein flow or extrusion of the sealing ring into the crack between the two joint halves is absolutely prevented, even though the sealing ring be made of the very soft or flowable material.

Further objects and advantages of the present invention will be apparent from the following description, reference being had to the accompanying drawing wherein a preferred form of the present invention is clearly shown.

Figure 1:
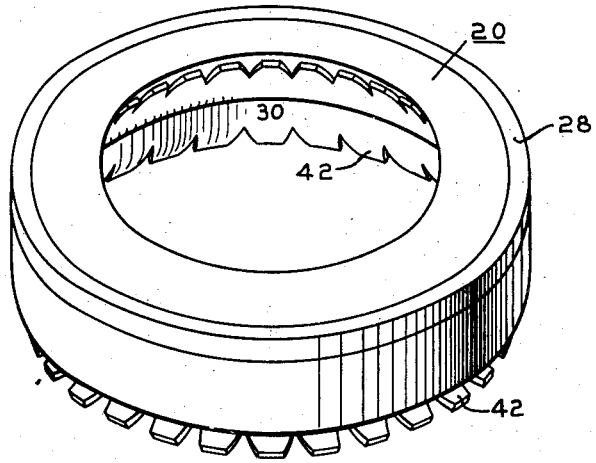
Figure 1 is a perspective view of a complete sealing ring embodying a preferred form of the present invention.
Figure 2:
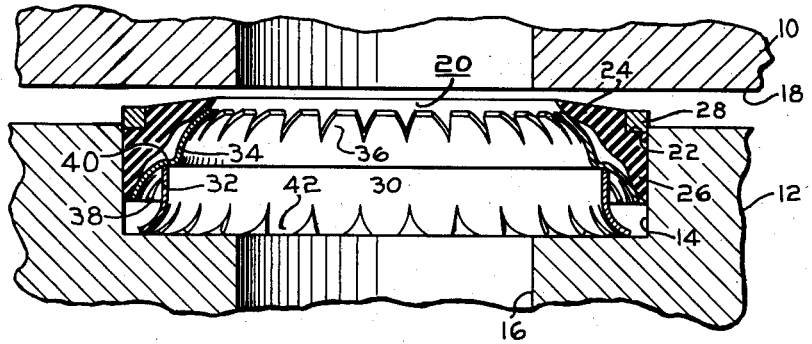
Figure 2 is a cross section of a conduit joint showing the sealing ring before the joint is completely assembled.

Referring now to the drawing, there is shown in Figure 2 a portion of a conduit joint which may be similar to that illustrated in the Martin patent above mentioned comprising the two joint halves 10 and 12. The latter has an annular recess 14 surrounding the conduit 16 and a face 18 along which the two halves abut one another.

Positioned in the recess 14 is a sealing ring 20 of generally triangular cross section with the upper corner recessed as indicated at 22. The ring in its unflexed condition before assembly of the joint halves is provided with an inwardly extending flexible lip portion 24 and a downwardly extending flexible lip portion 26. The ring 20 may be formed of neoprene or a similar synthetic or natural rubber-like material and preferably with a durometer hardness in the range of 65 to 85, although softer material may be equally satisfactorily used.

A reinforcing ring 28 of metal of any suitable cross sectional shape is placed in the recess 22. Beneath the ring 20 there is provided a retainer ring 30 preferably of springy sheet metal and consisting of two parts 32 and 34. The latter is provided with a plurality of resilient fingers 36 adapted to contact the lip 24 and similar fingers 38 contacting the lip 26. The portion 32 rests against a shoulder 40 on portion 34 and is provided with a plurality of resilient fingers 42 which flare outwardly at the bottom thereof.

Figure 3:
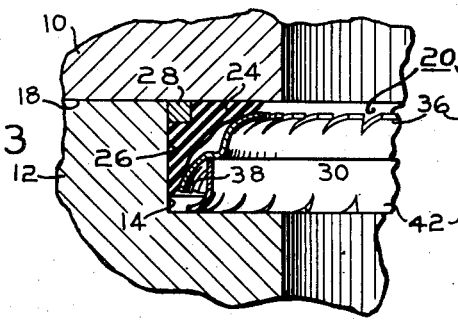
Figure 3 is a view corresponding to the left half of Figure 2 showing the joint in assembled relationship when not subjected to pressure.

When the sealing ring parts have been assembled in the conduit joint, as shown in Figure 2, the two halves 10 and 12 may be drawn together by suitable bolts or other fastening means, not shown, and the sealing ring will take the form shown in Figure 3. It will be noted that the lip 24 is tightly maintained in contact at its very inner corner with the flat surface 18 by the resilient fingers 36 while the lip 26 is similarly maintained in contact with the cylindrical wall of recess 14 by the fingers 38. Fluid pressure applied to the sealing ring tends to tighten this contact and absolutely prevent the flow of oil even in the minutest quantities through the crack at the surface 18.

Figure 4:
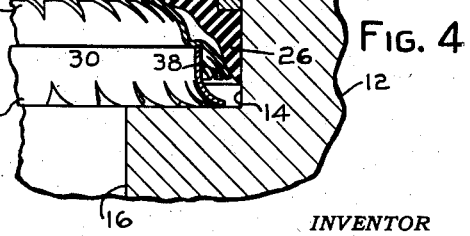
Figure 4 is a view corresponding to the right half of Figure 2 showing the joint in assembled relationship and subjected to pressure.

Should the joint halves and their fastening means be of such character that a relatively large crack opens up at the surface 18 when pressure is applied to the conduit, the rings 20 and 28 follow this movement, as illustrated in Figure 4. Since the resilient fingers 42 are considerably flexed by the action of initially bolting the parts together, they inherently tend to return to their initial shape. This together with a similar action at fingers 36 urges the inner edge of lip 24 upwardly to follow the member 10. Fluid pressure applied over the remaining under-surface of lip 24, and, in fact, pushing upwardly over the whole inner face of ring 20, thus urges the whole ring 20 and with it the reinforcing ring 28 upwardly to maintain them in contact with member 10. Since the ring 28 bridges the crack and is maintained in tight contact both with the cylindrical wall of the recess 14 and with the flat surface 18 of the member 10, no flow of the material of ring 20 can occur because there is no opening through which such flow can take place even though the crack between the two members open up to a very large opening.

While the form of embodiment of the invention as herein disclosed constitutes a preferred form, it is to be understood that other forms might be adopted, all coming within the scope of the claims which follow.

What is claimed is as follows:

1. A sealing ring for sealing a circular crack between two members confining a fluid under pressure and providing an annular recess adjacent the crack to receive the ring, said ring comprising a body of flexible material having the resilient characteristics of rubber and providing a pair of flexible lip portions, each in contact with one member, one extending generally radially and the other extending generally axially and, when unstressed before assembly, lying with the outer surfaces substantially conical, the said one being obtuse and the said other being acute, and a metallic resilient retainer positioned in the recess and providing a resilient force axially against said one lip and radially against said other lip.

2. A sealing ring for sealing a circular crack between two members confining a fluid under pressure and providing an annular recess adjacent the crack to receive the ring, said ring comprising a body of flexible material having the resilient characteristics of rubber and providing a pair of flexible lip portions, each in contact with one member, one extending generally radially and the other extending generally axially, and a metallic resilient retainer positioned in the recess and providing a resilient force axially against said one lip and radially against said other lip.

3. A sealing ring for sealing a circular crack between two members confining a fluid under pressure and providing an annular recess adjacent the crack to receive the ring, said ring comprising a body of flexible material having the resilient characteristics of rubber and providing a pair of flexible lip portions, each in contact with one member, one extending generally radially and the other extending generally axially, a metallic resilient retainer positioned in the recess and providing a resilient force axially against said one lip and radially against said other lip, and a metal reinforcing ring positioned at the juncture of the outer surfaces of said lips to prevent extrusion of the body through the crack when the members separate under pressure forces.

RALPH L. TWEEDALE.